(12) United States Patent
Yamanouchi

(10) Patent No.: US 11,262,441 B2
(45) Date of Patent: Mar. 1, 2022

(54) OBJECT DETECTION APPARATUS, OBJECT DETECTION METHOD, AND COMPUTER-READABLE RECORDING MEDIUM

(71) Applicant: NEC Corporation, Tokyo (JP)

(72) Inventor: Shingo Yamanouchi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 310 days.

(21) Appl. No.: 16/606,808

(22) PCT Filed: Mar. 1, 2018

(86) PCT No.: PCT/JP2018/007883
§ 371 (c)(1),
(2) Date: Oct. 21, 2019

(87) PCT Pub. No.: WO2018/198532
PCT Pub. Date: Nov. 1, 2018

(65) Prior Publication Data
US 2021/0103043 A1  Apr. 8, 2021

(30) Foreign Application Priority Data
Apr. 26, 2017 (JP) .............................. JP2017-087605

(51) Int. Cl.
*G01S 13/34* (2006.01)
*G01S 13/931* (2020.01)
(Continued)

(52) U.S. Cl.
CPC .............. *G01S 13/34* (2013.01); *G01S 7/352* (2013.01); *G01S 13/931* (2013.01); *G08G 1/16* (2013.01)

(58) Field of Classification Search
CPC ........... G01S 7/285; G01S 7/354; G01S 7/41; G01S 7/411; G01S 13/50
See application file for complete search history.

(56) References Cited

U.S. PATENT DOCUMENTS

2007/0247352 A1* 10/2007 Michael .................. G01S 13/34
342/128
2010/0315284 A1* 12/2010 Trizna ....................... G01S 7/18
342/123
(Continued)

FOREIGN PATENT DOCUMENTS

JP   H10-31065 A    2/1998
JP   2001-051056 A  2/2001
(Continued)

OTHER PUBLICATIONS

International Search Report for PCT Application No. PCT/JP2018/007883, dated Apr. 10, 2018.

*Primary Examiner* — Vladimir Magloire
*Assistant Examiner* — Artem Melkunov
(74) *Attorney, Agent, or Firm* — Sughrue Mion, PLLC

(57) ABSTRACT

An object detection apparatus 1 includes: an emitting unit 101 for emitting an RF transmission signal; a receiving unit 201 for receiving, if the RF transmission signal is reflected off an object, the reflected RF transmission signal as an RF reception signal; an IF signal generating unit 202 for generating, in every period, a complex IF signal based on a signal obtained by mixing the RF transmission signal with the RF reception signal; a position detecting unit 203 for detecting the position of the object based on an evaluation function generated based on the complex IF signal generated in every period; and a displacement detecting unit 204 for detecting a displacement of the object based on the position of the object and the phase of complex reflectance of the object calculated based on the complex IF signal.

19 Claims, 10 Drawing Sheets

(51) Int. Cl.
    *G08G 1/16*     (2006.01)
    *G01S 7/35*     (2006.01)

(56) References Cited

U.S. PATENT DOCUMENTS

2014/0022114 A1* 1/2014 Kamimura .............. G01S 7/285
                                                              342/134
2016/0155334 A1    6/2016   Jansson et al.
2016/0334502 A1  11/2016   Ali et al.

FOREIGN PATENT DOCUMENTS

| | | |
|---|---|---|
| JP | 2001-130412 A | 5/2001 |
| JP | 2003-185745 A | 7/2003 |
| JP | 2015-190952 A | 11/2015 |
| JP | 2016-122439 A | 7/2016 |
| JP | 2016-156751 A | 9/2016 |

\* cited by examiner

OBJECT DETECTION APPARATUS, OBJECT DETECTION METHOD, AND COMPUTER-READABLE RECORDING MEDIUM

This application is a National Stage Entry of PCT/JP2018/007883 filed on Mar. 1, 2018, which claims priority from Japanese Patent Application 2017-087605 filed on Apr. 26, 2017, the contents of all of which are incorporated herein by reference, in their entirety.

TECHNICAL FIELD

The present invention relates to an object detection apparatus and an object detection method for detecting an object using radio waves, and also relates to a computer-readable recording medium that stores a program for realizing the object detection apparatus and the object detection method.

BACKGROUND ART

Recent years has seen monitoring apparatus that use a radar being installed for the purpose of monitoring railroad crossings and intersections. For example, Patent Document 1 discloses a monitoring apparatus (railroad crossing protective apparatus) that uses an obstacle detection method of a reflection type utilizing radar waves. The monitoring apparatus disclosed in Patent Document 1 determines whether an obstacle is present or not present in a monitoring area.

However, since the monitoring apparatus disclosed in Patent Document 1 only has a function of determining whether an obstacle is present or not present in the monitoring area, obtainable information is insufficient in terms of monitoring of an area. That is to say, a distinction between an object whose presence in the monitoring area is problematic and other objects cannot be made simply by detecting the presence of a target object. For this reason, the monitoring apparatus disclosed in Patent Document 1 has a problem in making an erroneous warning, that is, an unnecessary warning is issued when a safe object enters the monitoring area.

To avoid the aforementioned problem of an erroneous warning being made, it is necessary to not only detect the presence of a target object, but to also determine the type of the target object and identify the behavior thereof to determine whether the presence of this target object in the monitoring area is safe or dangerous.

For this reason, Patent Document 2 and Patent Document 3 disclose a monitoring apparatus that measures the size or dimensions of a target object using a radar in order to identify the type of the target object. Specifically, the monitoring apparatus disclosed in Patent Document 2 makes radar waves turn on a horizontal plane to irradiate an entire railroad crossing with the radar waves, and forms a cross-sectional railroad crossing image using reflected waves that have reflected off an obstacle in the railroad crossing. Also, the monitoring apparatus disclosed in Patent Document 2 performs image processing on the obtained cross-sectional railroad crossing image to accurately recognize the size of the obstacle, and correctly identifies whether the obstacle is an automobile or a pedestrian or the like.

The monitoring apparatus disclosed in Patent Document 3 is installed at an intersection, and detects the position, speed, dimensions, and moving direction of an object that is present at the intersection and an object approaching the intersection, using a radar sensor. Note that the objects may include vehicles and people, who are vulnerable road users.

As a radar method for measuring the distance between a target object and the monitoring apparatus, the FMCW (Frequency Modulated Continuous Wave) method, in which transmitted waves with a continuously changing frequency are emitted, is often used. The distance resolution achieved by the FMCW method is given as c/(2BW), where the frequency bandwidth of an RF transmission signal is denoted as BW, and the light velocity is denoted as c. Also, for example, Patent Document 4 discloses that the MUSIC (Multiple Signal Classification method) is applied, as a means for increasing the distance resolution achieved by the FMCW method from c/(2BW), to signal processing in a radar using the FMCW method.

LIST OF PRIOR ART DOCUMENTS

Patent Document

Patent Document 1: Japanese Patent Laid-Open Publication No. 2001-051056
Patent Document 2: Japanese Patent Laid-Open Publication No. 2001-130412
Patent Document 3: Japanese Patent Laid-Open Publication No. 2016-122439
Patent Document 4: Japanese Patent Laid-Open Publication No. H10-031065

SUMMARY OF INVENTION

Problems to be Solved by the Invention

The monitoring apparatus disclosed in the aforementioned Patent Documents 2 and 3 identify the type of a target object based on the size or dimensions of the target object as described above, but a problem arises in that an error may occur in the identification. This is due to the fact that the size and dimensions of a target object that can be measured by a radar depend on the size or dimensions of the target object as seen by the radar. That is to say, the size or dimensions of the same target object as seen by the radar may change depending on the orientation or position of the target object, and thus, incorrect identification may occur.

For example, the size or dimensions of a target object as seen by a radar changes between a state where a person is standing, a state where a person is crouching down, and a state where a person is lying down. For this reason, it is difficult for a monitoring apparatus to identify that all of these target objects are people. Thus, there is a demand for a technology that enables more accurate identification of the type and behavior of a target object using a radar.

An example object of the invention is to solve the foregoing problems and provide an object detection apparatus, an object detection method, and a computer-readable recording medium that enable identification of an object without being affected by the state of the object.

Means for Solving the Problems

To achieve the above-stated example object, an object detection apparatus according to an example aspect of the invention is an object detection apparatus for detecting an object using radio waves, including:
an emitting unit configured to emit an RF transmission signal obtained by sweeping a frequency in every period;

a receiving unit configured to receive, if the RF transmission signal emitted by the emitting unit is reflected off the object, the RF transmission signal reflected off the object as an RF reception signal;

an IF signal generating unit configured to generate, in every period, a complex IF signal based on a signal obtained by mixing the RF transmission signal with the RF reception signal;

a position detecting unit configured to detect a position of the object based on an evaluation function generated based on the complex IF signal generated in every period; and a displacement detecting unit configured to detect a displacement of the object based on the position of the object detected by the position detecting unit and a phase of complex reflectance of the object calculated based on the complex IF signal.

To achieve the above-stated object, an object detection method according to an example aspect of the invention is an object detection method for detecting an object using radio waves, including:

(a) a step of emitting an RF transmission signal obtained by sweeping a frequency in every period;

(b) a step of receiving, if the RF transmission signal emitted in the (a) step is reflected off the object, the RF transmission signal reflected off the object as an RF reception signal;

(c) a step of generating, in every period, a complex IF signal based on a signal obtained by mixing the RF transmission signal with the RF reception signal;

(d) a step of detecting a position of the object based on an evaluation function generated based on the complex IF signal generated in every period; and (e) a step of detecting a displacement of the object based on the position of the object detected in the (d) step and a phase of complex reflectance of the object calculated based on the complex IF signal.

Furthermore, to achieve the above-stated object, a computer-readable recording medium according to an example aspect of the invention is a computer-readable recording medium in an object detection apparatus including:

an emitting unit configured to emit an RF transmission signal obtained by sweeping a frequency in every period; a receiving unit configured to receive, if the RF transmission signal emitted by the emitting unit is reflected off an object, the RF transmission signal reflected off the object as an RF reception signal; an IF signal generating unit configured to generate, in every period, a complex IF signal based on a signal obtained by mixing the RF transmission signal with the RF reception signal; and a processor, the recording medium storing a program including a command to cause the processor to perform:

(a) a step of detecting a position of the object based on an evaluation function generated based on the complex IF signal generated in every period; and (b) a step of detecting a displacement of the object based on the position of the object detected in the (a) step and a phase of complex reflectance of the object calculated based on the complex IF signal.

Advantageous Effects of the Invention

As described above, according to the invention, an object can be identified without being affected by the state of the object.

MODE FOR CARRYING OUT THE INVENTION

Example Embodiment

Hereinafter, an object detection apparatus, an object detection method, and a program according to an example embodiment of the invention will be described with reference to FIGS. 1 to 10.

[Apparatus Configuration]

Figure 1:
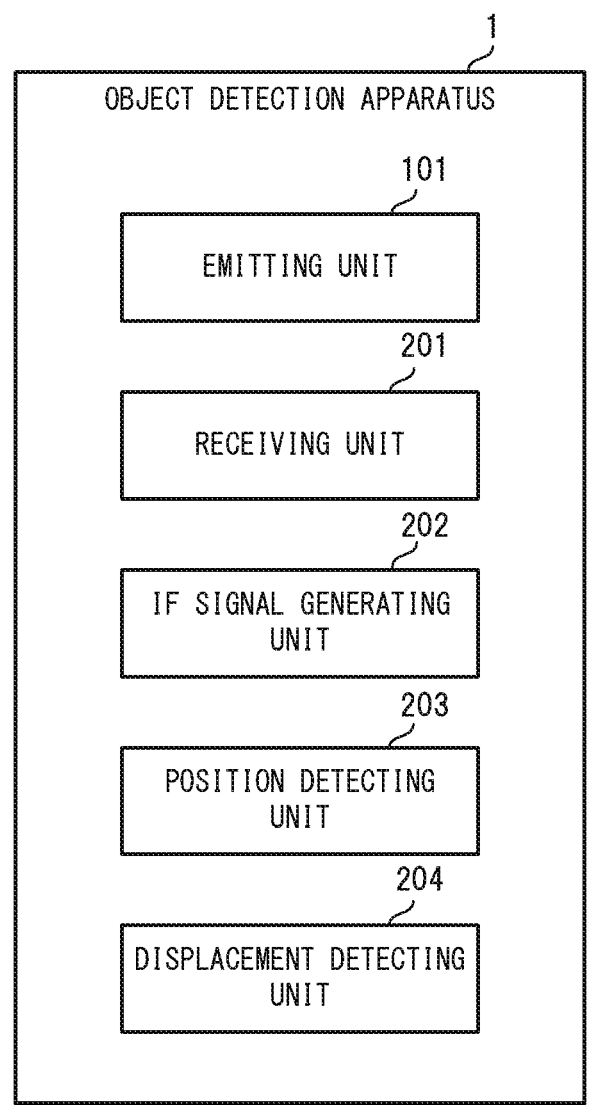
FIG. 1 is a block diagram that illustrates a configuration of an object detection apparatus according to an example embodiment of the invention.

First, a schematic configuration of the object detection apparatus according to this example embodiment will be described with reference to FIG. 1. FIG. 1 is a block diagram that illustrates a configuration of the object detection apparatus according to the example embodiment of the invention.

An object detection apparatus 1 according to this example embodiment shown in FIG. 1 is a apparatus for detecting an object using radio waves. As shown in FIG. 1, the object detection apparatus 1 includes an emitting unit 101, a receiving unit 201, an IF signal generating unit 202, a position detecting unit 203, and a displacement detecting unit 204.

The emitting unit 101 emits an RF transmission signal, which is obtained by sweeping a frequency in every period. If the RF transmission signal emitted by the emitting unit 101 is reflected off an object, the receiving unit 201 receives the reflected RF transmission signal (reflected wave) as an RF reception signal. In this example embodiment, a signal received by the receiving unit 201, that is, an RF transmission signal reflected off an object is referred to as an RF reception signal.

The IF signal generating unit 202 generates a complex IF signal in every period, based on a signal obtained by mixing an RF transmission signal and an RF reception signal. The position detecting unit 203 detects the position of an object based on an evaluation function generated based on the complex IF signal generated in every period. The displacement detecting unit 204 detects a displacement of an object based on the position of the object detected by the position detecting unit 203 and the phase of complex reflectance of the object that is calculated based on the complex IF signal.

Thus, the object detection apparatus 1 detects not only the position of an object that is present in an area to which radio waves are emitted, but also a displacement thereof. Since the displacement is detected based on the phase of the complex reflectance of an object, the displacement of a stationary thing is zero, whereas the displacement of a stationary person takes a value greater than zero, and thus, a distinction therebetween can be made. For this reason, according to the object detection apparatus 1, the type and behavior of an object can be identified without being affected by the state of the object.

Figure 2:
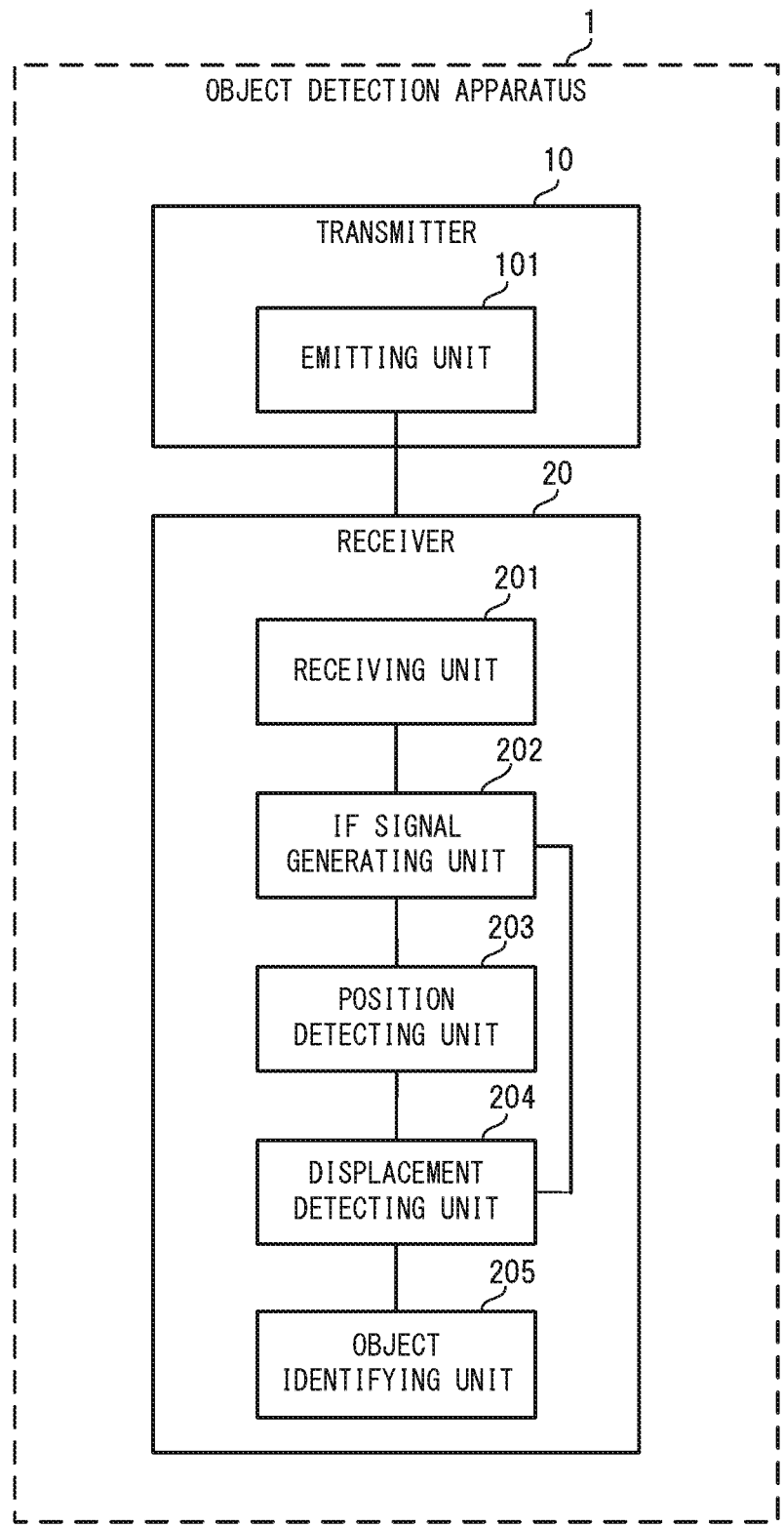
FIG. 2 is a block diagram that specifically illustrates the configuration of the object detection apparatus according to the example embodiment of the invention.

Next, the configuration of the object detection apparatus according to this example embodiment will be described in more detail, with reference to FIG. 2. FIG. 2 is a block diagram that specifically illustrates the configuration of the object detection apparatus according to the example embodiment of the invention.

As shown in FIG. 2, in this example embodiment, the object detection apparatus 1 includes a transmitter 10 and a receiver 20. The transmitter 10 includes the aforementioned emitting unit 101. The receiver 20 includes the aforementioned receiving unit 201, IF signal generating unit 202, position detecting unit 203, and displacement detecting unit 204. Furthermore, the receiver 20 also includes an object identifying unit 205.

In this example embodiment, the position detecting unit 203 detects the position of an object, or more specifically, the distance R between an object and the object detection apparatus 1, based on a peak position of the evaluation function generated based on the complex IF signal generated in every period. The evaluation function is expressed by Equation 22, which will be described later.

In this example embodiment, the displacement detecting unit 204 calculates the complex reflectance of an object based on information indicating the position of a target object detected by the position detecting unit 203 and the complex IF signal, by employing Expressions 23 and 24, which will be described later. The displacement detecting unit 204 then calculates an infinitesimal displacement or vibration of the object as a displacement of the object, based on the phase of the complex reflectance of the object. The thus-calculated displacement of the object is a characteristic element of the invention.

The object identifying unit 205 identifies one of or both the type and behavior of an object, based on the displacement of the object detected by the displacement detecting unit 204. For example, if the object is a fixed obstacle, the object does not vibrate and thus does not have any displacement either. Meanwhile, if the object is a person, the object has a vibration (displacement) of about 1 Hz when in a stationary state, and has a vibration (displacement) of about several Hz when in a walking state. If the object is a machine, such as a vehicle, the object has a vibration (displacement) of about several tens of Hz when in a state where an engine thereof is running, and does not vibrate when in a state where the engine is not running.

Accordingly, the object identifying unit 205 identifies an object by analyzing the pattern of the displacement (vibration) of the object.

[Apparatus Operations]

Figure 3:
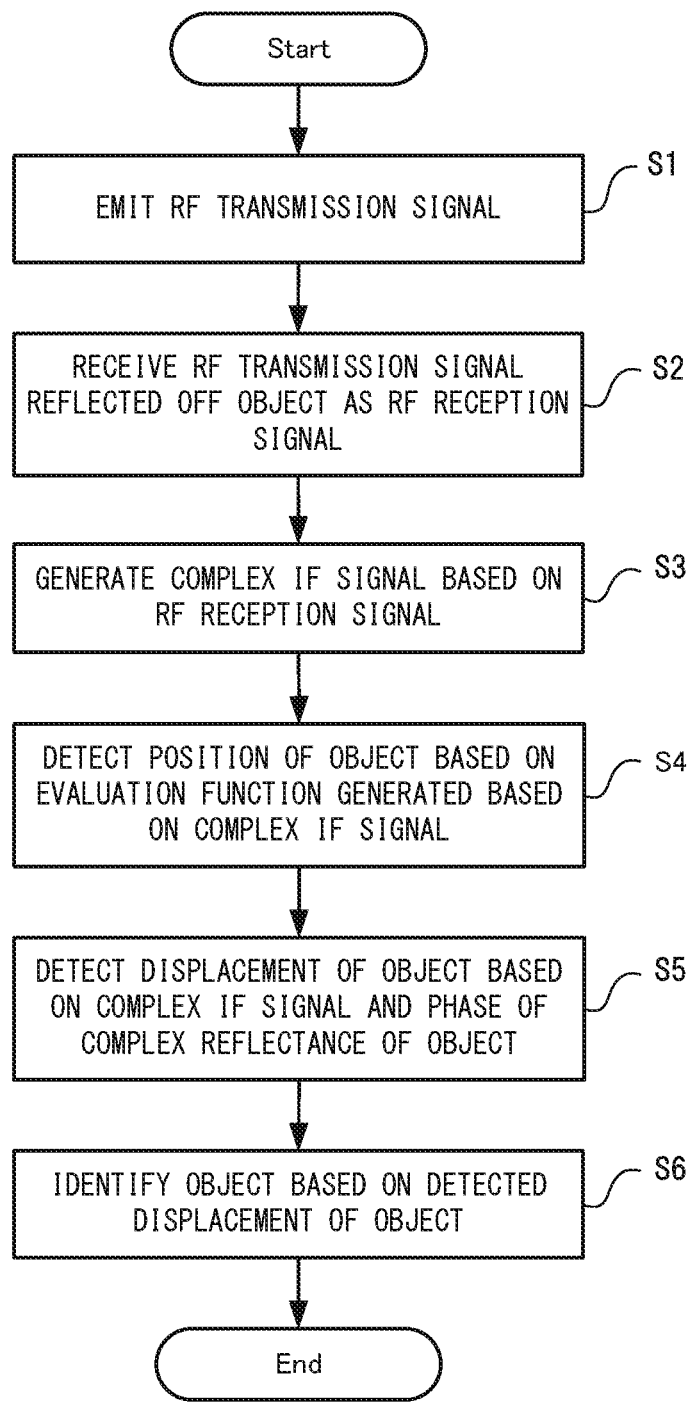
FIG. 3 is a flowchart that illustrates operations of the object detection apparatus according to the example embodiment of the invention.

Next, operations of the object detection apparatus 1 according to the example embodiment of the invention will be described with reference to FIGS. 3 to 7. FIG. 3 is a flowchart that illustrates operations of the object detection apparatus according to the example embodiment of the invention. The following description will refer to FIGS. 1 and 2 where appropriate. In this example embodiment, an object detection method is carried out by operating the object detection apparatus 1. Accordingly, the following description of the operations of the object detection apparatus 1 replaces the description of the object detection method according to this example embodiment.

Initially, in the transmitter 10, the emitting unit 101 emits a frequency-swept RF transmission signal toward a target area (step S1), as shown in FIG. 3. In step S1, for example, an RF transmission signal u(t) is a signal expressed by the following Equation 1.

$$u(t) = U \cos[\theta(t)] \qquad \text{[Equation 1]}$$

In Equation 1 above, t denotes time. U denotes the amplitude of the RF transmission signal u(t). θ denotes the phase. The phase θ is expressed as a function of the time t.

If an object is present in the area to which the RF transmission signal is emitted, the RF transmission signal is reflected off the object present. This signal reflected off the object returns to the object detection apparatus 1.

Next, upon the RF transmission signal being reflected off the object, the receiving unit receives the RF transmission signal that has been reflected off the object, as an RF reception signal (step S2). For example, the RF reception signal is a signal expressed by the following Equation 2.

$$u_0(t) = U_0 \cos[\theta_0(t)] \qquad \text{[Equation 2]}$$

In Equation 2 above, $U_0$ denotes the amplitude of the RF reception signal $u_0(t)$. $\theta_0(t)$ denotes the phase. The phase $\theta_0(t)$ is expressed as a function of the time t.

Also, in step S2, the receiving unit 201 transmits the RF reception signal $u_0(t)$ to the IF signal generating unit 202.

Next, the IF signal generating unit 202 acquires the RF transmission signal u(t) from the emitting unit 101, acquires the RF reception signal $u_0(t)$ from the receiving unit 201, and mixes the RF transmission signal u(t) with the RF reception signal $u_0(t)$ to generate a complex IF signal (step S3).

Figure 4:
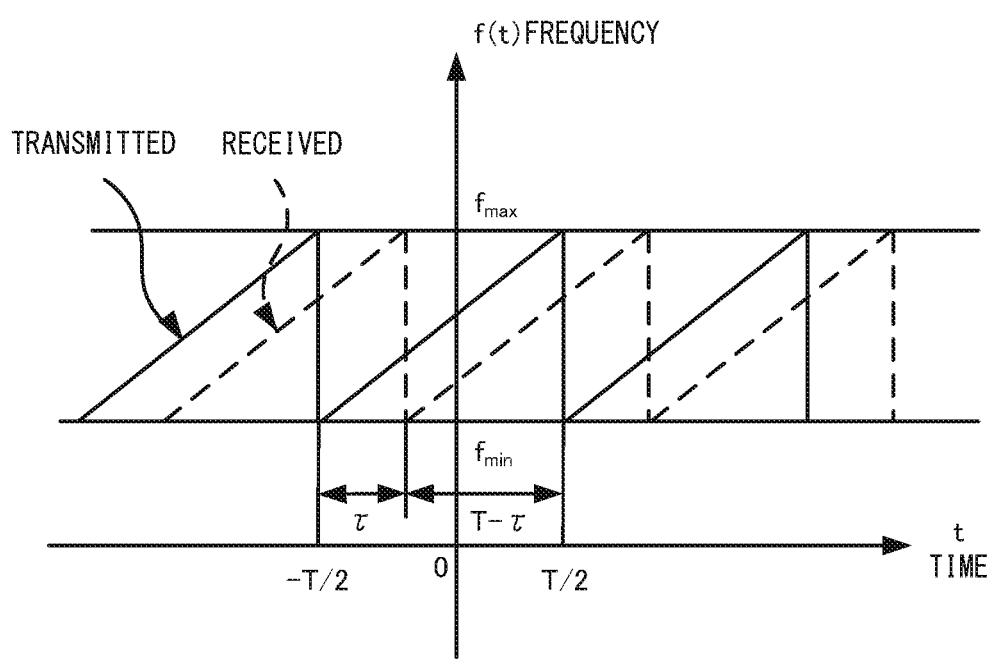
FIG. 4 illustrates an example of an RF transmission signal and an RF reception signal that are used in the example embodiment of the invention.

Specifically, the RF transmission signal u(t) acquired by the IF signal generating unit 202 is a chirp signal shown in FIG. 4, for example. It is assumed that the frequency f(t) of the chirp signal changes as expressed by the following Equation 3. FIG. 4 illustrates an example of the RF transmission signal and the RF reception signal that are used in the example embodiment of the invention.

$$f(t) = f_{min} + \alpha(t - kT) \qquad \text{[Equation 3]}$$

Here, the time t takes a value in a range: (kT−T/2)<t<(kT+T/2). k denotes an integer that is 0, ±1, ±2, . . . T denotes a signal period of the chirp signal. $f_{min}$ denotes the minimum frequency of the chirp signal. α denotes the rate of change (slope) of the frequency f(t) per unit time.

If the frequency f(t) of the RF transmission signal u(t) changes as expressed by Equation 3 above, the relationship expressed by the following Equation 4 holds between the frequency f(t) and the phase θ(t).

$$f(t) = (1/2\pi) \times (d\theta(t)/dt) \qquad \text{[Equation 4]}$$

Based on Equations 3 and 4 above, the phase θ(t) is calculated as expressed by the following Equation 5. Note that, in the following Equation 5, t−kT is replaced with $t_k$ since $t_k$=t−kT.

$$\theta(t_k) = 2\pi f_{min} t_k + \pi \alpha t_k^2 \qquad \text{[Equation 5]}$$

If, for example, the RF reception signal $u_0(t)$ acquired by the IF signal generating unit is the chirp signal shown in FIG. 4, a delay time τ occurs between the RF transmission signal u(t) and the RF reception signal $u_0(t)$. At this time, the relationship of the phase expressed by the following Equation 6 holds.

$$\theta_0(t) = \theta(t-\tau) \quad \text{[Equation 6]}$$

If the light velocity is denoted as c, and the distance to a target object in a single chirp transmission period is denoted as R, the relationship expressed by the following Equation 7 holds between the distance R and the delay time τ.

$$\tau = 2R/c \quad \text{[Equation 7]}$$

The IF signal generating unit 202 mixes the acquired RF transmission signal u(t) with the acquired RF reception signal $u_0(t)$ to generate an IF signal. Specifically, the IF signal generating unit 202 generates an in-phase component I(t) of the IF signal that is expressed by the following Equation 8 and a quadrature component Q(t) of the IF signal that is expressed by the following Equation 9, for example.

$$I(t) = \cos[\theta_w(t)] \quad \text{[Equation 8]}$$

$$Q(t) = \sin[\theta_w(t)] \quad \text{[Equation 9]}$$

If the IF signal generating unit 202 includes a quadrature demodulator, the IF signal generating unit 202 can generate the in-phase component I(t) and the quadrature component Q(t) of the IF signal using the quadrature demodulator. Otherwise, if the IF signal generating unit 202 includes a modulator, the IF signal generating unit 202 can generate the in-phase component I(t) of the IF signal using the modulator, and can also generate the quadrature component Q(t) by applying Hilbert transform to the in-phase component I(t).

The phase $\theta_w(t)$ of the IF signal is the phase expressed by the following Equation 10. In Equation 10, the time $t_k$ takes a value in a range: $(-T/2+\tau) < t_k < (T/2)$.

$$\theta_w(t) = \theta(t) - \theta_0(t) \quad \text{[Equation 10]}$$
$$= 2\pi f_{min}\tau - \pi\alpha(\tau^2 - 2t_k\tau)$$

If the position of an object (the distance from the object detection apparatus 1 to a target object) R(t) is 30 meters, the delay time τ=0.2 u seconds. A typical value of $t_k$ is a chirp period T (about 1 m second). Accordingly, if the delay time τ is compared with $t_k$ in Equation 10 above, the delay time τ is sufficiently smaller than $t_k$.

If the condition that the delay time $\tau \ll t_k$ is applied to Equation 10 above, approximation can be made such that the term $\tau^2$ is ignored. As a result, the phase $\theta_w(t)$ of the IF signal is expressed by the following Equation 11.

$$\theta_w(t) = 4\pi f_{min}R/c + 4\pi\alpha R\, t_k/c \quad \text{[Equation 11]}$$

The IF signal generating unit 202 then generates a complex IF signal S(t), which is given by the following Equation 12, based on the in-phase component I(t) and the quadrature component Q(t) of the IF signal.

$$S(t) = I(t) + jQ(t) = \exp[\theta_w(t)] \quad \text{[Equation 12]}$$

Next, the position detecting unit 203 detects the position of the object based on an evaluation function generated by the complex IF signal generated in every period (step S4). Here, it is presumed that N objects are present at positions at distances $R_1, R_2, \ldots, R_N$, respectively. The complex IF signal S(t) obtained in this case is given by the following Equation 13, according to the superposition theorem.

$$S(t_k) = \sum_{n=1}^{N} \sigma(R_n)R_n^{-2}\exp[j\theta_w(t)] = \quad \text{[Equation 13]}$$
$$\sum_{n=1}^{N} \sigma(R_n)R_n^{-2}\exp[j4\pi f_{min}R_n/c + j4\pi\alpha R_n t_k/c],$$

In Equation 13 above, $\sigma(R_n)$ denotes the reflectance of an object that is present at the distance $R_n$. The reflectance $\sigma(R_n)$ is an unknown. By detecting the positions $R_1, R_2, \ldots, R_N$ at which the reflectance $\sigma(R_n)$ of the target objects is not zero, the distances $R_1, R_2, \ldots, R_N$ to the target objects can be determined. Equation 13 above can also be expressed by the following Equation 14.

$$\vec{S} = A\vec{\sigma}', \quad \text{[Equation 14]}$$

In Equation 14 above, S on the left side denotes a K×1-order vector, which is defined by the following Equation 15.

$$\vec{S} = [S(t_1), S(t_2), \ldots, S(t_K)]^t, \quad \text{[Equation 15]}$$

In Equation 15 above, $S(t_1), S(t_2), \ldots, S(t_K)$ are values of the complex IF signal at sampling time $t_1, t_2, \ldots, t_K$ in a single chirp, and K denotes the number of sampling points. [ ]$^t$ in Equation 15 above denotes a transpose of the vector.

In Equation 14 above, A on the right side denotes a K×N-order matrix, which is defined by the following Equation 16.

$$A = [\vec{a}(R_1), \vec{a}(R_2), \ldots, (R_N)], \quad \text{[Equation 16]}$$

A is also called a direction matrix. A vector a(R) in the direction matrix A is defined by the following Equation 17. Note that the vector a(R) is called a direction vector.

$$\vec{a}(R) = [\exp(j\varphi_1(R)), \exp(j\varphi_2(R)), \ldots, \exp(j\varphi_K(R))]^t, \varphi_k(R) = 4\pi\alpha t_k R/c, \quad \text{[Equation 17]}$$

In Equation 14 above, σ' in the right side is an N×1-order vector, which is defined by the following Equation 18.

$$\vec{\sigma}' = [\sigma'(R_1), \sigma'(R_2), \ldots, \sigma'(R_N)]^t, \quad \text{[Equation 18]}$$

Here, $\sigma'(R_n)$ (n=1, 2, ..., N) denotes complex reflectance of a target object at the distance $R_n$, and is defined by the following Equation 19.

$$\sigma'(R_n) = \sigma(R_n)R_n^{-2}\exp[j4\pi f_{min}R_n/c], \quad \text{[Equation 19]}$$

In the case where Equation 14 above holds, the positions $R_1, R_2, \ldots, R_N$ at which the reflectance $\sigma(R_n)$ of the target objects is not zero can be detected by applying the processing of the MUSIC method. Thus, the distances $R_1, R_2, \ldots, R_N$ of the target objects can be measured accurately.

Accordingly, in this example embodiment, in step S4, the position detecting unit 203 measures the distance to each target object and determines the position thereof by performing the processing of the MUSIC method using the complex IF signal S(t) generated by the IF signal generating unit 202. In the following description, a more detailed description will be given of the method for determining the position of an object performed by the position detecting unit 203 in this example embodiment.

The position detecting unit 203 calculates a vector $S_g$, which is obtained by taking, out of the vector S defined by Equation 15 above, a subelement of the vector S, the vector $S_g$ being defined by the following Equation 20. In the following Equation 20, G denotes the number of elements of the vector $S_g$.

$$\vec{S}_g = [S(t_g), S(t_{g+1}), \ldots, S(t_{g+G-1})]^t, (g=1, 2, \ldots, K-G+1)$$ [Equation 20]

Next, the position detecting unit 203 calculates a correlation matrix $R_s$ using the vector $S_g$ in accordance with the following Equation 21. In the following Equation 20, the suffix H in the equation denotes a complex conjugate transposition.

$$R_S = \frac{1}{K-G+1} \sum_{g=1}^{K-G+1} \vec{S}_g \vec{S}_g^H,$$ [Equation 21]

Next, the position detecting unit 203 calculates a characteristic vector $[e_1, e_2, \ldots, e_G]$ of the correlation matrix $R_S$. Furthermore, the position detecting unit 203 extracts a characteristic vector with which the characteristic value is smallest, and generates a matrix: $E_N = [e_{N+1}, e_{N+2}, \ldots, e_G]$.

Next, the position detecting unit 203 calculates an evaluation function $P_{MU}(R)$ based on the MUSIC method that is defined by the following Equation 22, using the matrix $E_N$ calculated from the correlation matrix $R_S$ and the direction vector a(R) defined by Equation 17 above.

$$P_{MU}(R) = \frac{\vec{a}^H(R) \cdot \vec{a}(R)}{\vec{a}^H(R) E_N E_N^H \vec{a}(R)},$$ [Equation 22]

In Equation 22 above, a variable R may be obtained by sweeping any value. In the MUSIC method, the evaluation function $P_{MU}(R)$ has peaks at the positions $R_1, R_2, \ldots, R_N$ at which the reflectance $\sigma(R_n)$ of an object is not zero. Accordingly, the distances $R_1, R_2, \ldots, R_N$ to the target objects can be measured based on the peak positions of the evaluation function $P_{MU}(R)$.

Figure 5:
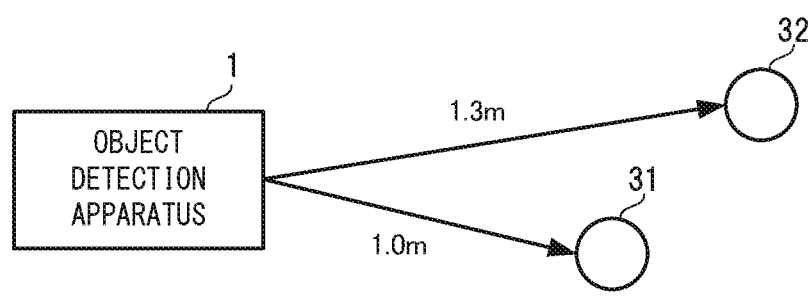
FIG. 5 illustrates an example of the positional relationship between the object detection apparatus according to the example embodiment of the invention and objects to be detected.

Here, a description will be given, with reference to FIG. 5, of an example of the results of detecting objects obtained in step S4. FIG. 5 illustrates an example of the positional relationship between the object detection apparatus according to the example embodiment of the invention and objects to be detected.

It is assumed that an object 31 is present at a position away from the object detection apparatus 1 by 1 m, and an object 32 is present at a position away from the object detection apparatus 1 by 1.3 m, as shown in FIG. 5. In this example, the emitting unit 101 of the object detection apparatus 1 transmits an RF transmission signal (FMCW signal) with a minimum RF frequency of 24.05 GHz, a maximum RF frequency of 24.25 GHz, and an RF frequency band of 200 MHz. The chirp period is 1024 μs, the number K of sampling points per chirp period is 101, and the number G of elements of the vector $S_g$ is 75.

Figure 6:
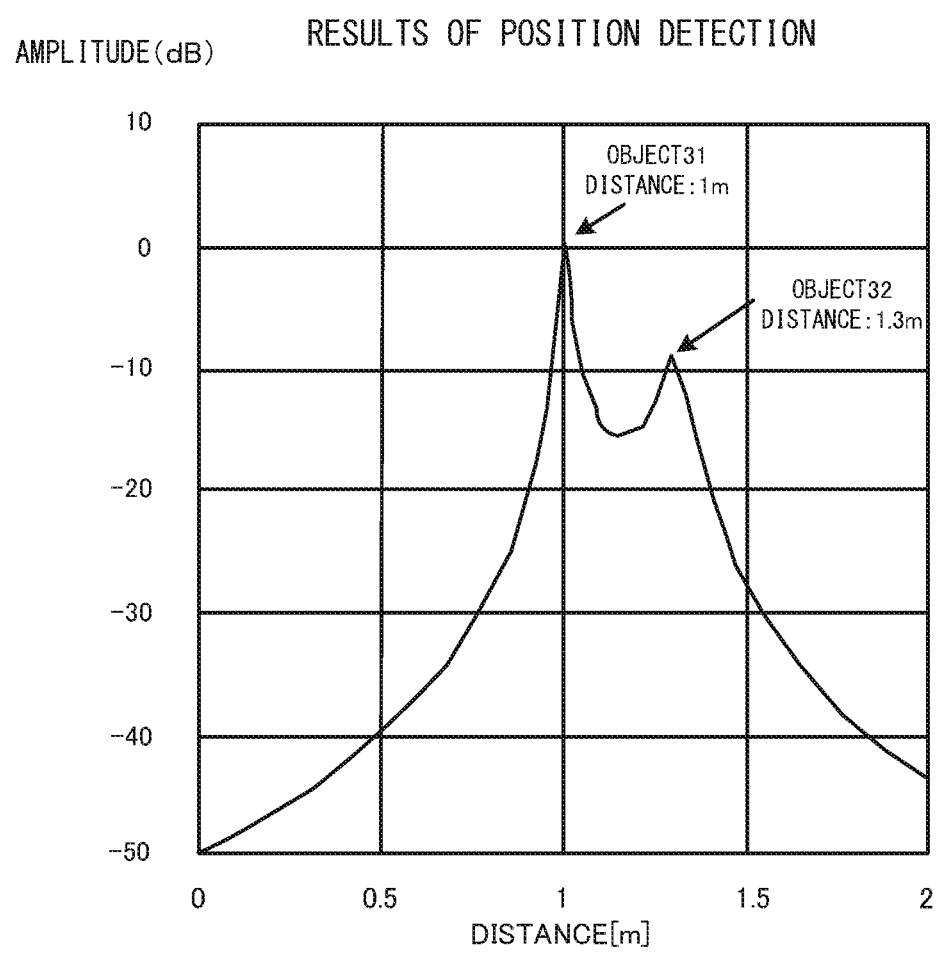
FIG. 6 illustrates an example of the results of position detection in step S4 shown in FIG. 3.

If the evaluation function $P_{MU}(R)$ calculated in step S4 is applied to the example arrangement shown in FIG. 5, the results are as shown in FIG. 6. FIG. 6 illustrates an example of the results of position detection in step S4 shown in FIG. 3. In the evaluation function shown in FIG. 6, peaks that correspond to the object 31 and the object 32 are obtained at the position at a distance of 1 m from the object detection apparatus 1 and at the position at a distance of 1.3 m therefrom. Accordingly, the position detecting unit 203 specifies the positions of the object 31 and the object 32 as 1 m and 1.3 m away, respectively, based on the peak positions of the evaluation function shown in FIG. 6. In addition, since two target objects that are separate from each other by 30 cm can be detected separately, it is confirmed in this example that the object detection apparatus 1 has a distance resolution of 30 cm.

As already described in the background art, the distance resolution achieved in the normal FMCW method is given as c/(2BW), where the bandwidth of the frequency of an RF transmission signal is denoted as BW, and the light velocity is denoted as c. Accordingly, if the bandwidth BW is 200 MHz, the theoretical value of the distance resolution is 75 cm. In this regard, in this example embodiment, the MUSIC method, which is a super-resolution algorithm, is applied in step S4, and thus, the distance resolution is improved to about ½ to ⅓ of the distance resolution in the case of a normal FMCW radar.

The distance from the object detection apparatus 1 to each object is measured by performing the above-described steps S1 to S4, but it is difficult to identify the type and behavior of each object simply by measuring the distance to the object. As already mentioned, for each type or behavior of the object, an infinitesimal displacement or vibration with a specific pattern is generated by an object, and thus, measurement and analysis of such an infinitesimal displacement or vibration are required to identify the type and behavior of the object.

For this reason, in this example embodiment, after step S4 has been performed, the displacement detecting unit 204 detects a displacement of each object based on the position of the object detected by the position detecting unit 203 and the phase of the complex reflectance of the object calculated based on the complex IF signal (step S5). If an object is a person or a vehicle, the displacement of the object takes a very small value that is 1 cm or less, and thus, the displacement detected in step S5 is, specifically, an infinitesimal displacement or vibration of the object.

Now, processing performed by the displacement detecting unit 204 will be described in detail. Initially, the displacement detecting unit 204 calculates the vector σ' defined by Equation 18 above, based on the following Equation 23, using the distances $R_1, R_2, \ldots, R_N$ to the objects calculated in step S4.

$$\vec{\sigma}' = (A^H A)^{-1} A^H \vec{S},$$ [Equation 23]

In addition, as described regarding the definition of Equation 16 above, information indicating the distances $R_1, R_2, \ldots, R_N$ to the target objects are required to determine the direction matrix A. Accordingly, the displacement detecting unit 204 calculates the complex reflectance $\sigma'(R_n)$ (n=1, 2, \ldots, N) of the object located at the distance $R_n$, based on elements of the vector σ' calculated using Equation 23 above.

Next, the displacement detecting unit 204 calculates an infinitesimal displacement $\Delta R_n$ of the object located at the distance $R_n$, based on the phase $D\sigma'(R_n)$ of the calculated complex reflectance $\sigma'(R_n)$ (n=1, 2, \ldots, N) of the object, in accordance with the following Equation 24. Note that the following Equation 24 is obtained by modifying Equation 19 above.

$$\Delta R_n = \frac{c}{4\pi f_{min}} \angle \sigma'(R_n),$$ [Equation 24]

If an error of the phase $D\sigma'(R_n)$ is denoted as $\Delta\theta$, an error of the displacement is given as $c\Delta\theta/(4\pi f_{in})$. For example, if the error $\Delta\theta$ is 3 degrees, and the minimum RF frequency $f_{min}$ is 24.05 GHz, the error of the displacement takes a very small value, namely 52 μm. In this example embodiment, the accuracy of displacement detection is increased by using the phase of the complex reflectance in displacement detection.

The displacement detecting unit 204 then calculates the infinitesimal displacement $\Delta R_n$ for every chirp, thereby acquiring data regarding temporal changes in the infinitesimal displacement $\Delta R_n$.

Also, in step S5, a displacement of each object is detected based on the phase of the complex reflectance of the object, as mentioned above. To obtain the complex reflectance of an object, a complex IF signal is required. This complex IF signal may be one that is generated by the IF signal generating unit 202 using a quadrature demodulator or Hilbert transform.

Here, a description will be given of an example of the detection results of the infinitesimal displacement or vibration of an object obtained in step S5. Similarly to the example in step S4, it is assumed that an object 31 is present at a position away from the object detection apparatus 1 by 1 m, and an object 32 is present at a position away from the object detection apparatus 1 by 1.3 m, as shown in FIG. 5. It is also assumed that the object 31 is vibrating with an amplitude of 3 mm and a frequency of 3 Hz. It is also assumed that the object 32 is vibrating with an amplitude of 3 mm and a frequency of 1 Hz. In this example, the object detection apparatus 1 transmits an RF transmission signal (FMCW signal) with a minimum RF frequency of 24.05 GHz, a maximum RF frequency of 24.25 GHz, and an RF bandwidth of 200 MHz. The chirp period is 1024 μs, the number K of sampling points per chirp period is 101, and the number G of elements of the vector $S_g$ is 75.

Figure 7:
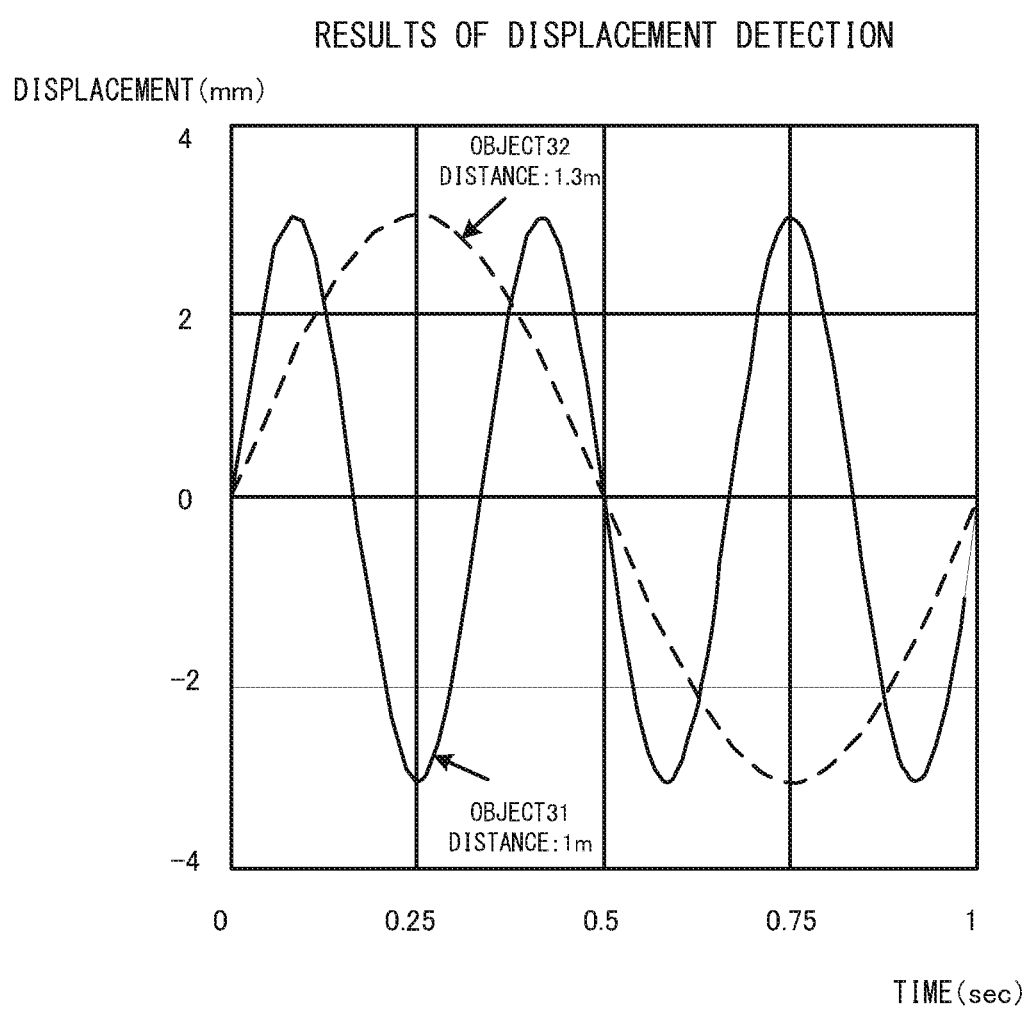
FIG. 7 illustrates an example of the results of displacement detection in step S5 shown in FIG. 3.

FIG. 7 shows displacements of the object 31 and the object 32 calculated in step S5 in the example arrangement shown in FIG. 5. FIG. 7 illustrates an example of the results of position detection in step S5 shown in FIG.3. As indicated by the results shown in FIG. 7, the vibration of the object 31 with an amplitude of 3 mm and a frequency of 3 Hz and the vibration of the object 32 with an amplitude of 3 mm and a frequency of 1 Hz are correctly detected in step S5.

Next, the object identifying unit 205 identifies the type or behavior of the objects, based on the displacement of the objects detected in step S5 by the displacement detecting unit 204 (step S6). Specifically, in step S6, if, for example, the displacement detected in step S5 is zero, the object identifying unit 205 determines that the object is a fixed obstacle. If the displacement detected in step S5 is about 1 Hz, the object identifying unit 205 determines that the object is a stationary person.

Furthermore, if the time-series change in the distance detected in step S4 matches the walking speed of a person, and the displacement detected in step S5 is a vibration with a frequency of several Hz, the object identifying unit 205 determines that the object is a walking person. If the time-series change in the distance detected in step S4 is zero, but the displacement detected in step S5 is a vibration with a frequency of about several tens of Hz, the object identifying unit 205 determines that the object is a stopped vehicle.

As described above, in this example embodiment, measurement of an infinitesimal displacement or vibration of each object is performed by the displacement detecting unit 204, in addition to the measurement of the distance to each object performed by the position detecting unit 203. For this reason, in this example embodiment, the type or behavior of an object can be identified based on the infinitesimal displacement or vibration of the object, unlike the case of a conventional apparatus that only measures the distance to an object.

Note that the above equations may be stored in units, or may be stored in a storage apparatus that is not shown in FIG. 2. In the latter case, each unit reads out the equations from the storage apparatus when needed.

[Program]

A program according to this example embodiment need only be a program for causing a computer to perform steps S3 to S6 shown in FIG. 3. By installing this program in the computer and executing it, the object detecting apparatus 1 and the object detection method according to this example embodiment can be realized. In this case, a processor in the computer functions as the position detecting unit 203, the displacement detecting unit 204, and the object identifying unit 205, and performs processing. The computer may be a general-purpose personal computer, or may be an embedded computer such as an in-vehicle computer.

The program according to this example embodiment may also be executed by a computer system that is constituted by a plurality of computers. In this case, for example, each of the computers may function as any of the position detecting unit 203, the displacement detecting unit 204, and the object identifying unit 205.

[Example Modification]

Next, an example modification of this example embodiment will be described. In the above-described example, in step S4, the position of an object is detected (the distance to an object is measured) based on the MUSIC method, but the method used in step S4 is not particularly limited in this example embodiment. For example, in this example modification, in step S4, the position detection of an object may alternatively be performed (the distance to an object may be measured) based on an ESPRIT (Estimation of Signal Parameters via Rotational Invariance Technique) method.

Note that both the MUSIC method and the ESPRIT method were originally developed for use in estimation of the arrival direction of radio waves, and both are known as ultrahigh-resolution algorithms that use a so-called null steering method, in which a null point of the antenna directivity is steered toward the arrival direction. In this example embodiment, the ESPRIT method is used to measure the distance to a target object, rather than to estimate the arrival direction of radio waves.

Now, step S4 in the case of detecting the position of an object (measuring the distance to an object) based on the ESPRIT method will be described in detail. In this example modification, in step S4, the position detecting unit 203 first calculates the vector $S_g$ that is defined by Equation 20 above and is obtained by taking, out of the vector S defined by Equation 15 above, a subelement of the vector S. Furthermore, the position detecting unit 203 calculates the correlation matrix $R_S$ in accordance with Equation 21 above, using the vector $S_g$.

However, since the ESPRIT method is used in this example modification, a condition that the sampling times $t_1$, $t_2$, . . . , $t_k$ of the IF signal are provided at equal intervals needs to be satisfied. That is to say, the IF signal needs to be sampled at fixed sampling time $\Delta t$.

Next, the position detecting unit 203 calculates the characteristic vector $[e_1, e_2, \ldots, e_G]$ of the correlation matrix $R_S$. Furthermore, a matrix $E_S = [e_1, e_2, \ldots, e_N]$ is generated using a characteristic vector other than the characteristic vector $[e_1, e_2, \ldots, e_G]$ with which the characteristic value is smallest.

Next, the position detecting unit 203 calculates matrices $E_X$ and $E_Y$, which are given by the following Equation 25, using the matrix $E_S$. In Equation 25, a matrix J1 is a (G−1)×G-order matrix generated by adding a zero vector to a Gth column in a (G−1)×(G−1)-order unit matrix. A matrix J2 is a (G−1)×G-order matrix generated by adding a zero vector to the first column in the (G−1)×(G−1)-order unit matrix.

$$E_X = J_1 E_S, E_Y = J_2 E_S \quad \text{[Equation 25]}$$

Next, the position detecting unit 203 calculates a matrix $\Psi = E_X^{-1} E_Y$ based on the calculated matrices $E_X$ and $E_Y$. Furthermore, the position detecting unit 203 calculates a characteristic value $\beta_n$ (n=1, 2, ..., N) of the matrix $\Psi$.

Next, the position detecting unit 203 calculates the positions $R_1, R_2, \ldots, R_N$ of the target objects based on the following Equation 26, using the calculated characteristic value $\beta_n$ (n=1, 2, ..., N) of the matrix $\Psi$.

$$R_n = \frac{c}{4\pi\alpha\Delta t} \angle \beta_n, (n = 1, 2, \ldots, N) \quad \text{[Equation 26]}$$

Then, in this example modification as well, the displacement detecting unit 204 detects an infinitesimal displacement or vibration of each object (step S5), and the object identifying unit 205 identifies the type or behavior of each object (step S6), similarly to the example shown in FIG. 3.

Thus, in this example embodiment, either the MUSIC method or the ESPRIT method may be used as a method for detecting the position of an object (measuring the distance to an object) in step S4. Also, the method for detecting the position of a target object (measuring the distance to a target object) in step S4 is required to be a high-resolution method that enables a plurality of objects that are close to each other to be detected separately. That is to say, in this example embodiment, it is preferable to use an ultrahigh-resolution algorithm using the null steering method, which is typified by the MUSIC method or the ESPRIT method, to detect the position of an object (measure the distance to an object).

[Example Application 1]

Figure 8:
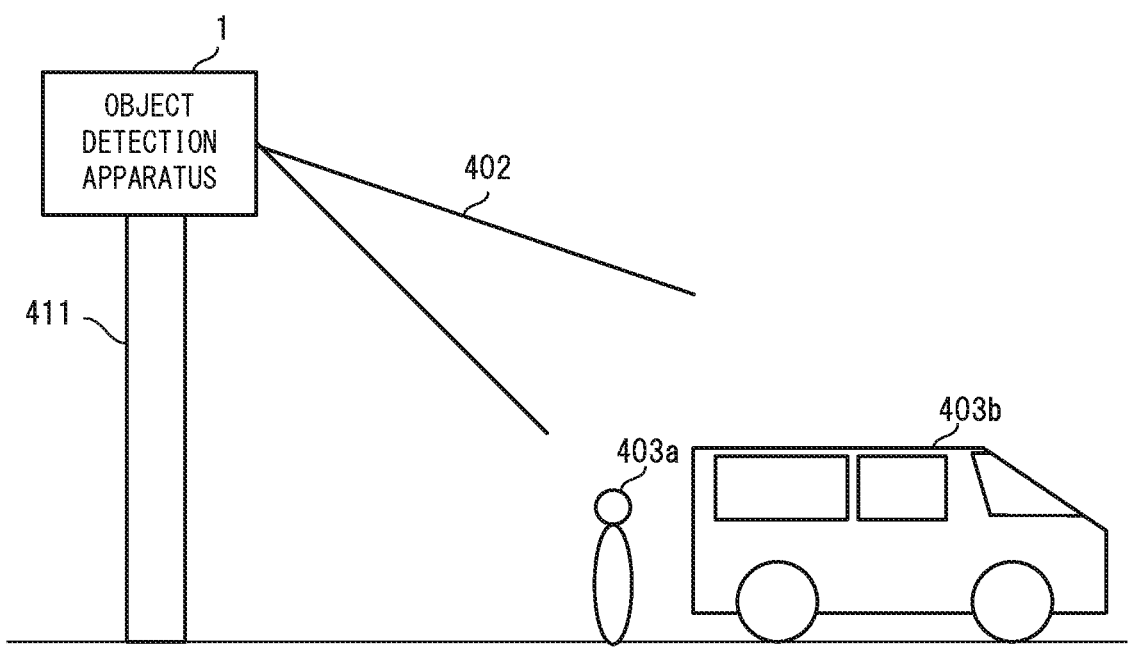
FIG. 8 illustrates an example application of object detection according to the example embodiment of the invention.

Next, an example application of the object detection apparatus 1 according to this example embodiment will be described below with reference to FIG. 8. FIG. 8 illustrates an example application of object detection according to an example embodiment of the invention.

In the example application 1, the object detection apparatus 1 is installed on a fixing jig 411, which protrudes from the ground surface, and detects objects that are present on the ground surface, as shown in FIG. 8. Objects to be detected may include a pedestrian, a vehicle such as an automobile, and so on, for example. In the example in FIG. 8, an object 403a is a pedestrian, and an object 403b is a vehicle. Note that the objects to be detected are not limited thereto, and may be objects other than a pedestrian and a vehicle. Although a railroad crossing, an intersection, and the like, are envisioned as locations at which the object detection apparatus 1 is to be installed, the locations at which the object detection apparatus 1 is installed are not necessarily limited thereto.

In the example in FIG. 8, the object detection apparatus 1 attached to the fixing jig 411 emits RF transmission signals 402 to a preset area. Upon the RF transmission signals 402 being reflected off the objects 403a and 403b, the object detection apparatus 1 receives the reflected waves. The object detection apparatus 1 then detects the positions of the objects 403a and 403b using the MUSIC method or the ESPRIT method, and also measures displacement of the objects.

Then, the object detection apparatus 1 identifies the types of the objects based on the displacement of the objects 403a and 403b. For example, the object 403a, which is a pedestrian, exhibits a displacement (movement) with a frequency of several Hz or less, depending on the movement state thereof. The object 403b, which is a vehicle such as an automobile, exhibits a displacement (vibration) of about several tens of Hz, depending on the operating state thereof.

By using the fact that the frequency of displacement (vibration) thus differs depending on the type of each object, the object detection apparatus 1 identifies the types of the detected objects. In the example in FIG. 8, the object detection apparatus 1 identifies the object 403a as a pedestrian, and identifies the object 403b as a vehicle. Although, in this example application 1, the frequency of displacement is used to identify the type of an object, this is merely an example. In the example application 1, the type of an object may alternatively be identified using a pattern of a time waveform of displacement, for example.

In the example application 1, the object detection apparatus 1 can also identify the behavior (state) of each object. For example, a displacement detected in the case where an object is a pedestrian is a vibration with a low frequency of about 1 Hz if the pedestrian has stopped, and is a vibration (displacement) with a relatively high frequency of several Hz if the pedestrian is walking. A displacement detected in the case where an object is a vehicle is zero if the vehicle engine is not running, and is a vibration (displacement) of about several tens of Hz if the vehicle engine is running. Accordingly, the object detection apparatus 1 can identify the behavior (state) of an object by measuring a vibration (displacement) of the object. Thus, information indicating the behavior (state) of an object can be used in safety monitoring at a railroad crossing or an intersection.

[Example Application 2]

Figure 9:
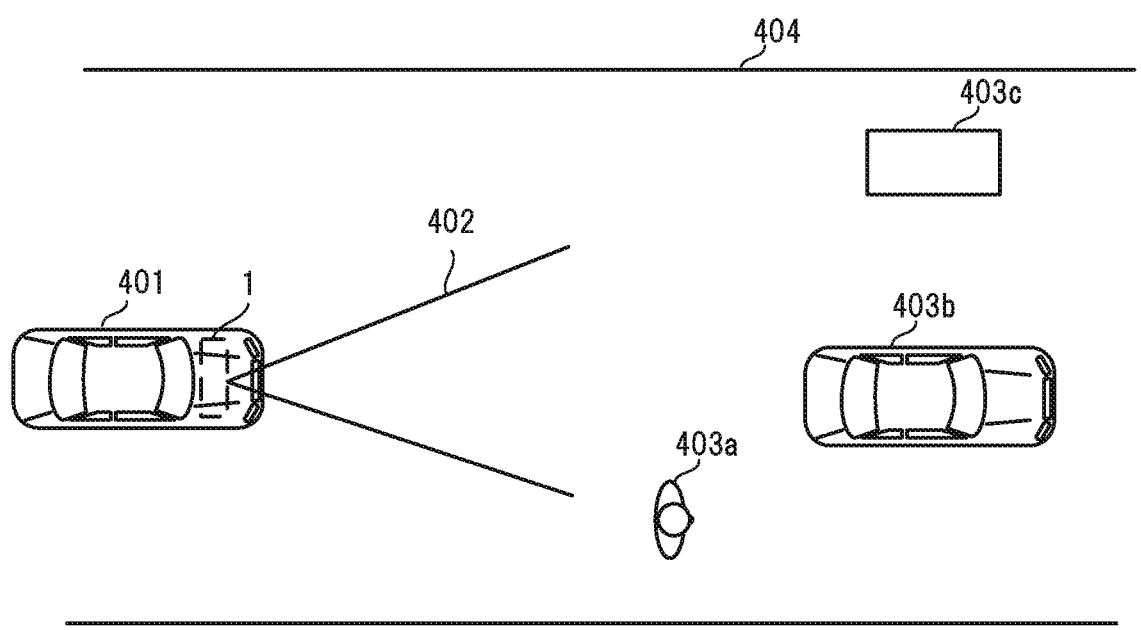
FIG. 9 illustrates another example application of object detection according to the example embodiment of the invention.

Next, another application example of the object detection apparatus 1 according to this example embodiment will be described below with reference to FIG. 9. FIG. 9 illustrates another example application of object detection according to the example embodiment of the invention.

In the example application 2, the object detection apparatus 1 is mounted in a moving body 401, as shown in FIG. 9. In the example in FIG. 9, the moving body 401 is a vehicle. Note that the moving body 401 does not necessarily have to be a vehicle.

Also, as shown in FIG. 9, the object detection apparatus 1 mounted in the moving body 401 detects objects 403a, 403b, and 403c, which are present on a side in the direction in which the moving body 401 is advancing, and measures the positions and displacements of these objects. The object detection apparatus 1 then identifies the types of the objects 403a, 403b, and 403c, based on the displacements of the objects. In the example in FIG. 9, the object 403a is a pedestrian, and the object 403b is a vehicle. The object 403c is an obstacle (fixed body).

In the example application 2 as well, the object detection apparatus 1 detects the positions of the objects 403a, 403b, and 403c using the MUSIC method or the ESPRIT method, and also measures displacements of the objects. The object detection apparatus 1 then identifies the types of the objects 403a, 403b, and 403c, based on the displacements thereof.

For example, a pedestrian exhibits a displacement (movement) with a frequency of about several Hz or less, and a vehicle exhibits a displacement (vibration) with a frequency of about several tens of Hz, as mentioned in the example application 1. A fixed body exhibits no displacement (vibration), and the displacement thereof is zero.

Thus, in the example application 2 as well, the types of the detected objects are identified using the fact that the frequency of displacement (vibration) differs depending on the type of each object, similarly to the example application 1. Also, in the example application 2 as well, the frequency of displacement is used to distinguish between the types of the objects, similarly to the example application 1. However, this is merely an example. In the example application 2 as well, the type of an object may be distinguished using a pattern of a time waveform of displacement thereof.

In the example application 2, the object detection apparatus 1 in the state of being mounted in the moving body 401 can not only detect the presence of objects, but also identify the types of the objects, and thus can improve traffic safety.

For example, if the object 403a can be identified as a pedestrian, the object detection apparatus 1 can predict that the pedestrian may make a dangerous action, e.g. cross a road 404, and can instruct the moving body 401 to take safety measures, e.g. lower the moving speed. Also, if the object 403c can be identified as a fixed obstacle, the object detection apparatus 1 can predict that the obstacle will continue to be present at the same position, and can instruct the moving body 401 to change the direction. Also, if the object 403b can be identified as a vehicle, the object detection apparatus 1 can predict that the object 403b will continue to move along the road, and can instruct the moving body 401 to not excessively approach the object 403b.

Thus, according to the example application 2, the object detection apparatus 1 can predict movement of an object and notify the moving body 401 of the prediction results, in accordance with the identified type of the object. Thus, the moving body 401 can use the prediction results for the purpose of safety traveling.

[Physical Configuration]

Figure 10:
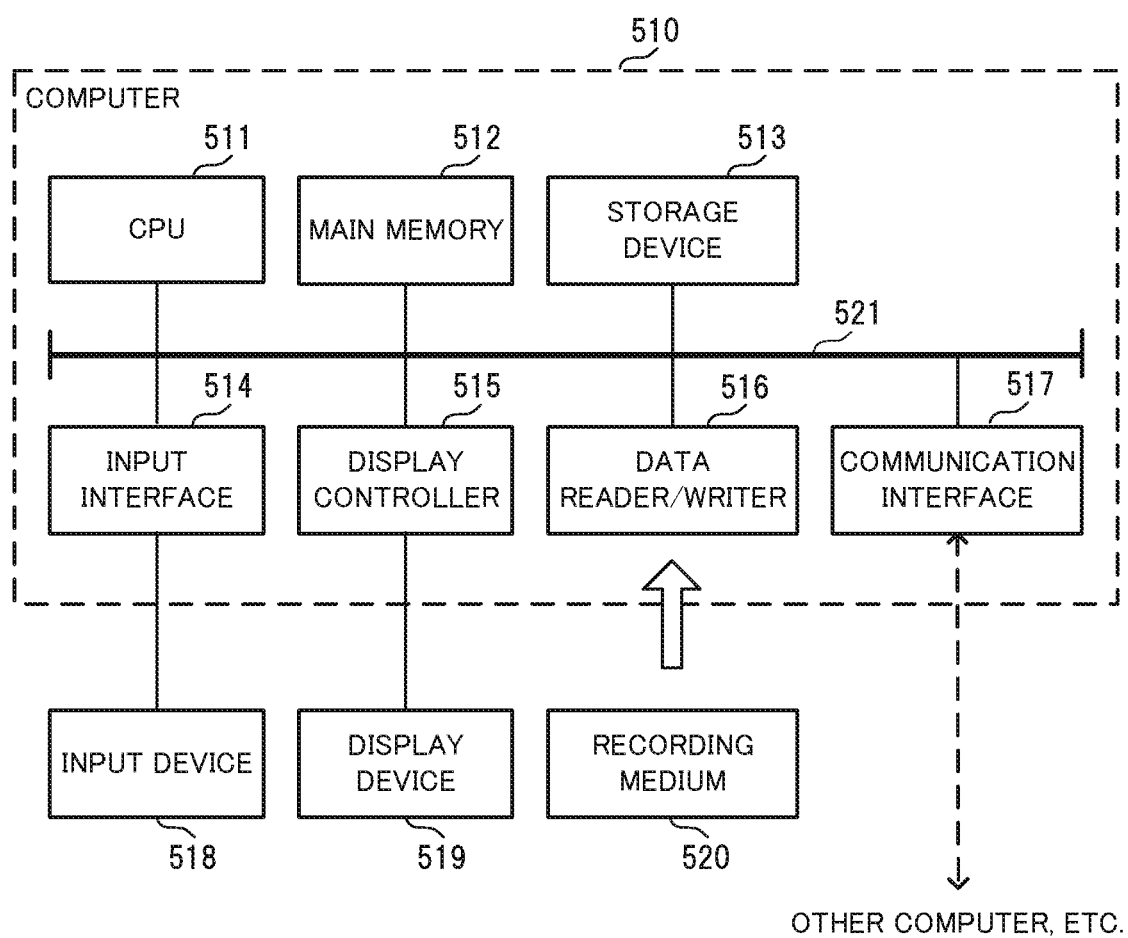
FIG. 10 is a block diagram that illustrates an example of a computer that realizes the object detection apparatus according to the example embodiment of the invention.

A description will now be given, with reference to FIG. 10, of an example of a computer that realizes the object detection apparatus 1 by executing the program according to this example embodiment. FIG. 10 is a block diagram that illustrates an example of a computer that realizes the object detection apparatus according to the example embodiment of the invention.

As shown in FIG. 10, a computer 510 includes a CPU (Central Processing Unit) 511, a main memory 512, a storage device 513, an input interface 514, a display controller 515, a data reader/writer 516, and a communication interface 517. These units are connected to each other via a bus 521 so as to be able to communicate data. Note that the computer 510 may include a GPU (Graphics Processing Unit) or an FPGA (Field-Programmable Gate Array) in addition to or in place of the CPU 511.

The CPU 511 loads the program (codes) according to this example embodiment that is stored in the storage device 513 to the main memory 512 and executes the program in a predetermined order, thereby performing various kinds of computation. The main memory 512 typically is a volatile storage device, such as a DRAM (Dynamic Random Access Memory). The program according to this example embodiment is provided in a state of being stored in a computer-readable recording medium 520. Note that the programs according to this example embodiment may also be distributed on the Internet to which the computer is connected via a communication interface 517.

Specific examples of the storage device 513 may include a hard disk drive, a semiconductor storage device such as a flash memory, and the like. The input interface 514 mediates data transmission between the CPU 511 and input devices 518 such as a keyboard and a mouse. The display controller 515 is connected to a display device 519 and controls a display on the display device 519.

The data reader/writer 516 mediates data transmission between the CPU 511 and the recording medium 520, reads out the program from the recording medium 520, and writes, in the recording medium 520, the results of processing performed by the computer 510. The communication interface 517 mediates data transmission between the CPU 511 and other computers.

Specific examples of the recording medium 520 may include a general-purpose semiconductor storage device such as a CF (Compact Flash (registered trademark)) or a SD (Secure Digital), a magnetic recording medium such as a Flexible Disk, and an optical recording medium such as a CD-ROM (Compact Disk Read Only Memory).

Note that the object detection apparatus 1 according to this example embodiment may also be realized not only by the computer in which the program is installed, but by using hardware that corresponds to each portion of the computer. Furthermore, a part of the object detection apparatus 1 may be realized by the program, and the remaining part may be realized by hardware.

Part of, or the entire example embodiment described above can be expressed by the following (Supplementary Note 1) to (Supplementary Note 19), but is not limited thereto.

(Supplementary Note 1)

An object detection apparatus for detecting an object using radio waves, including:

an emitting unit configured to emit an RF transmission signal obtained by sweeping a frequency in every period;

a receiving unit configured to receive, if the RF transmission signal emitted by the emitting unit is reflected off the object, the RF transmission signal reflected off the object as an RF reception signal;

an IF signal generating unit configured to generate, in every period, a complex IF signal based on a signal obtained by mixing the RF transmission signal with the RF reception signal;

a position detecting unit configured to detect a position of the object based on an evaluation function generated based on the complex IF signal generated in every period; and a displacement detecting unit configured to detect a displacement of the object based on the position of the object detected by the position detecting unit and a phase of complex reflectance of the object calculated based on the complex IF signal.

(Supplementary Note 2)

The object detection apparatus according to Supplementary note 1, further including an object identifying unit configured to identify at least one of a type and behavior of the object, based on the displacement of the object.

(Supplementary Note 3)

The object detection apparatus according to Supplementary note 1 or 2, wherein the IF signal generating unit includes a quadrature demodulator, and mixes the RF transmission signal with the RF reception signal using the quadrature demodulator to generate the complex IF signal.

(Supplementary Note 4)

The object detection apparatus according to Supplementary note 1 or 2, wherein the IF signal generating unit generates the complex IF signal by applying Hilbert transform to the signal obtained by mixing the RF transmission signal with the RF reception signal.

(Supplementary Note 5)

The object detection apparatus according to any one of Supplementary notes 1 to 4, wherein the position detecting unit uses, as the evaluation function, an evaluation function obtained based on a null steering method, and detects the position of the object based on a peak position of the evaluation function.

(Supplementary Note 6)

The object detection apparatus according to Supplementary note 5, wherein the position detecting unit uses a multiple signal classification method as the null steering method.

(Supplementary note 7)

The object detection apparatus according to Supplementary note 5, wherein the position detecting unit uses an estimation of signal parameters via rotational invariance technique method as the null steering method.

(Supplementary Note 8)

An object detection method for detecting an object using radio waves, including:

(a) a step of emitting an RF transmission signal obtained by sweeping a frequency in every period;

(b) a step of receiving, if the RF transmission signal emitted in the (a) step is reflected off the object, the RF transmission signal reflected off the object as an RF reception signal;

(c) a step of generating, in every period, a complex IF signal based on a signal obtained by mixing the RF transmission signal with the RF reception signal;

(d) a step of detecting a position of the object based on an evaluation function generated based on the complex IF signal generated in every period; and (e) a step of detecting a displacement of the object based on the position of the object detected in the (d) step and a phase of complex reflectance of the object calculated based on the complex IF signal.

(Supplementary Note 9)

The object detection method according to Supplementary note 8, further including (f) a step of identifying at least one of a type and behavior of the object, based on the displacement of the object.

(Supplementary Note 10)

The object detection method according to Supplementary note 8 or 9, wherein, in the (c) step, the RF transmission signal is mixed with the RF reception signal by the quadrature demodulator to generate the complex IF signal.

(Supplementary Note 11)

The object detection method according to Supplementary note 8 or 9, wherein, in the (c) step, the complex IF signal is generated by applying Hilbert transform to the signal obtained by mixing the RF transmission signal with the RF reception signal.

(Supplementary Note 12)

The object detection method according to any one of Supplementary notes 8 to 11, wherein, in the (d) step, an evaluation function obtained based on a null steering method is used as the evaluation function, and the position of the object is detected based on a peak position of the evaluation function.

(Supplementary Note 13)

The object detection method according to Supplementary note 12, wherein, in the (d) step, a multiple signal classification method is used as the null steering method.

(Supplementary Note 14)

The object detection method according to Supplementary note 12, wherein, in the (d) step, an estimation of signal parameters via rotational invariance technique method is used as the null steering method.

(Supplementary Note 15)

A computer-readable recording medium in an object detection apparatus including: an emitting unit configured to emit an RF transmission signal obtained by sweeping a frequency in every period; a receiving unit configured to receive, if the RF transmission signal emitted by the emitting unit is reflected off an object, the RF transmission signal reflected off the object as an RF reception signal; an IF signal generating unit configured to generate, in every period, a complex IF signal based on a signal obtained by mixing the RF transmission signal with the RF reception signal; and a processor, the recording medium storing a program including a command to cause the processor to perform:

(a) a step of detecting a position of the object based on an evaluation function generated based on the complex IF signal generated in every period; and (b) a step of detecting a displacement of the object based on the position of the object detected in the (a) step and a phase of complex reflectance of the object calculated based on the complex IF signal.

(Supplementary note 16)

The computer-readable recording medium according to Supplementary note 15, wherein the program further includes a command to cause the processor to perform (c) a step of identifying at least one of a type and behavior of the object, based on the displacement of the object.

(Supplementary note 17)

The computer-readable recording medium according to Supplementary note 15 or 16, wherein, in the (a) step, an evaluation function obtained based on a null steering method is used as the evaluation function, and the position of the object is detected based on a peak position of the evaluation function.

(Supplementary note 18)

The computer-readable recording medium according to Supplementary note 17, wherein, in the (a) step, a multiple signal classification method is used as the null steering method.

(Supplementary note 19)

The computer-readable recording medium according to Supplementary note 17, wherein, in the (a) step, an estimation of signal parameters via rotational invariance technique method is used as the null steering method.

Although an example embodiment of the present invention has been described, this example embodiment is an example, and does not limit the scope of the invention. Addition, various omission, replacement, and modification may be made to the example embodiment without departing from the gist of the invention.

The invention of the present application has been described above with reference to the example embodiments, but the invention of the present application is not limited to the above example embodiment. The configurations and the details of the invention of the present application can be modified in various manners that can be understood by those skilled in the art within the scope of the invention of the present application.

This application is based upon and claims the benefit of priority from Japanese application No. 2017-87605, filed on Apr. 26, 2017, the disclosure of which is incorporated herein in its entirety by reference.

INDUSTRIAL APPLICABILITY

As described above, according to the invention, an object can be identified without being affected by the state of the object. The invention is useful as a railroad crossing monitoring apparatus for monitoring a railroad crossing, a vehicle monitoring apparatus mounted in a vehicle for monitoring the surroundings thereof, and the like, for example.

DESCRIPTIONS OF REFERENCE SIGNS

1 Object detection apparatus
10 Transmitter
20 Receiver
31, 32 Object
101 Emitting unit
201 Receiving unit
202 IF signal generating unit
203 Position detecting unit
204 Displacement detecting unit
205 Object identifying unit
401 Moving body
402 RF transmission signal
403a, 403b, 403c Object
404 Road
411 Fixing jig
510 Computer
511 CPU
512 Main memory
513 Storage device
514 Input interface
515 Display controller
516 Data reader/writer
517 Communication interface
518 Input device
519 Display device
520 Recording medium
521 Bus

The invention claimed is:

1. An object detection apparatus for detecting an object using radio waves, comprising:
an emitting unit configured to emit an RF transmission signal obtained by sweeping a frequency in every period;
a receiving unit configured to receive, if the RF transmission signal emitted by the emitting unit is reflected off the object, the RF transmission signal reflected off the object as an RF reception signal;
an IF signal generating unit configured to generate, in every period, a complex IF signal based on a signal obtained by mixing the RF transmission signal with the RF reception signal;
a position detecting unit configured to detect a position of the object based on an evaluation function generated based on the complex IF signal generated in every period; and
a displacement detecting unit configured to detect a displacement of the object based on the position of the object detected by the position detecting unit and a phase of complex reflectance of the object calculated based on the complex IF signal.

2. The object detection apparatus according to claim 1, further comprising
an object identifying unit configured to identify at least one of a type and behavior of the object, based on the displacement of the object.

3. The object detection apparatus according to claim 1, wherein the IF signal generating unit includes a quadrature demodulator, and mixes the RF transmission signal with the RF reception signal using the quadrature demodulator to generate the complex IF signal.

4. The object detection apparatus according to claim 1, wherein the IF signal generating unit generates the complex IF signal by applying Hilbert transform to the signal obtained by mixing the RF transmission signal with the RF reception signal.

5. The object detection apparatus according to claim 1, wherein the position detecting unit uses, as the evaluation function, an evaluation function obtained based on a null steering method, and detects the position of the object based on a peak position of the evaluation function.

6. The object detection apparatus according to claim 5, wherein the position detecting unit uses a multiple signal classification method as the null steering method.

7. The object detection apparatus according to claim 5, wherein the position detecting unit uses an estimation of signal parameters via rotational invariance technique method as the null steering method.

8. An object detection method for detecting an object using radio waves, comprising:
(a) emitting an RF transmission signal obtained by sweeping a frequency in every period;
(b) receiving, if the RF transmission signal emitted in the (a) step is reflected off the object, the RF transmission signal reflected off the object as an RF reception signal;
(c) generating, in every period, a complex IF signal based on a signal obtained by mixing the RF transmission signal with the RF reception signal;
(d) detecting a position of the object based on an evaluation function generated based on the complex IF signal generated in every period; and
(e) detecting a displacement of the object based on the position of the object detected in the (d) step and a phase of complex reflectance of the object calculated based on the complex IF signal.

9. A non-transitory computer-readable recording medium in an object detection apparatus including: an emitting unit configured to emit an RF transmission signal obtained by sweeping a frequency in every period; a receiving unit configured to receive, if the RF transmission signal emitted by the emitting unit is reflected off an object, the RF transmission signal reflected off the object as an RF reception signal; an IF signal generating unit configured to generate, in every period, a complex IF signal based on a signal obtained by mixing the RF transmission signal with the RF reception signal; and a processor, the recording medium storing a program including a command to cause the processor to perform:
(a) a step of detecting a position of the object based on an evaluation function generated based on the complex IF signal generated in every period; and
(b) a step of detecting a displacement of the object based on the position of the object detected in the (a) step and a phase of complex reflectance of the object calculated based on the complex IF signal.

10. The object detection method according to claim 8, further including
(f) identifying at least one of a type and behavior of the object, based on the displacement of the object.

11. The object detection method according to claim 8, wherein, in the (c), the RF transmission signal is mixed with the RF reception signal by the quadrature demodulator to generate the complex IF signal.

12. The object detection method according to claim 8, wherein, in the (c), the complex IF signal is generated by applying Hilbert transform to the signal obtained by mixing the RF transmission signal with the RF reception signal.

13. The object detection method according to claim 8, wherein, in the (d), an evaluation function obtained based on a null steering method is used as the evaluation function, and the position of the object is detected based on a peak position of the evaluation function.

14. The object detection method according to claim 13, wherein, in the (d), a multiple signal classification method is used as the null steering method.

15. The object detection method according to claim 14, wherein, in the (d), an estimation of signal parameters via rotational invariance technique method is used as the null steering method.

16. The non-transitory computer-readable recording medium according to claim 9,
wherein the program further includes a command to cause the processor to perform
(e) a step of identifying at least one of a type and behavior of the object, based on the displacement of the object.

17. The non-transitory computer-readable recording medium according to claim 16,
wherein, in the (a) step, an evaluation function obtained based on a null steering method is used as the evaluation function, and the position of the object is detected based on a peak position of the evaluation function.

18. The non-transitory computer-readable recording medium according to claim 17,
wherein, in the (a) step, a multiple signal classification method is used as the null steering method.

19. The non-transitory computer-readable recording medium according to claim 17,
wherein, in the (a) step, an estimation of signal parameters via rotational invariance technique method is used as the null steering method.

* * * * *